UNITED STATES PATENT OFFICE.

GUSTAVE FÉLIX COLLANTIER, OF PARIS, FRANCE.

COATING MATERIAL FOR DECORATING AND BUILDING PURPOSES.

SPECIFICATION forming part of Letters Patent No. 638,497, dated December 5, 1899.

Application filed August 2, 1899. Serial No. 725,869. (No specimens.)

*To all whom it may concern:*

Be it known that I, GUSTAVE FÉLIX COLLANTIER, a citizen of the French Republic, residing at Paris, France, have invented certain new and useful Improvements in Coating Materials for Decorating and Building Purposes, of which the following is a specification.

This invention relates to compositions or compounds to be employed for coating surfaces, and the new compound in which this invention is embodied has the advantage that it may be applied in a very thin layer on all kinds of surfaces, rigid or yielding, such as plaster, brick, wood, metal, textile fabrics, and the like. The compound forms a coating which resembles stone or marble. It is more or less smooth or granular in texture, and it permits flexible fabrics to which it has been applied to retain in a good degree their natural flexibility. The result of this is that a fabric covered with a coating of this composition may be employed for decorative purposes as a covering for walls, like ordinary decorative canvas, so that they may be made to imitate stone or marble.

The improved composition of matter is formed by the mixture of two compounds, one of which is of solid substances and the other liquid. The compound of solids is formed as follows: grit or sand, one hundred and eighty grams; carbonate of lime, one hundred grams; phosphate of lime, two hundred grams; pumice, sixty grams; talc, twenty grams; total, five hundred and sixty grams. These substances are reduced to powder and intimately mixed together. To this compound is added a liquid compound formed as follows: spirits of turpentine, eighty-five grams; clear oil-varnish or gum-copal dissolved in boiled oil and spirits of turpentine, eighty grams; water, thirty grams; siccative or borate of manganese, twenty-five grams; white lead ground in oil, two hundred and twenty grams; total, four hundred and forty grams. The mixture of five hundred and sixty grams of dry powdered solid material with the four hundred and forty grams of the liquid mixture makes one kilogram of the coating material ready for use.

The surface to be covered, if pervious, should be first filled or prepared, this preliminary preparation consisting in applying to the surface one or two coats of oil-paint or simply of siccative oil. This coating is intended to make the surface waterproof, and it will be unnecessary where the surface is already waterproof, as in the case of metal, glass, ceramic ware, &c.

The new composition may be applied in many ways—as, for example, if the coating is to be quite thick it may be applied with a trowel. If it is to be thin, it may be applied with a brush.

In order to make an imitation of stone with this mixture, one or more coatings are first laid on the surface to be covered, and when the coating material commences to set an elastic roller is passed over its surface and imparts to it a regular grain, imitating the stone. When the coating material has become sufficiently hard, the operation is finished by rubbing the surface over with dry gravel or sandstone. The plastic material may be colored variously with pigments and be employed for manufacturing artificial marble.

Having thus described my invention, I claim—

The herein-described coating composition, which consists of a compound of solid matter namely: sand, carbonate of lime, phosphate of lime, pumice and talc, in powdered form, and a liquid compound, namely: spirits of turpentine, oil-varnish, water, a siccative and white lead ground in oil, these two compounds being mixed together and the ingredients being in substantially the proportions specified.

In witness whereof I have hereunto signed my name, this 21st day of July, 1899, in the presence of two subscribing witnesses.

GUSTAVE FÉLIX COLLANTIER.

Witnesses:
 EDWARD P. MACLEAN,
 ALEXANDRE MATHIEU.